T. DAVIS.
SPARK PLUG.
APPLICATION FILED NOV. 10, 1919.
1,438,300.
Patented Dec. 12, 1922.
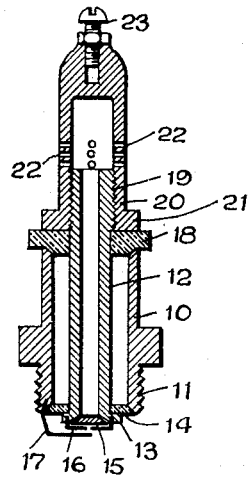
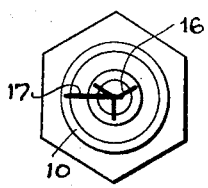
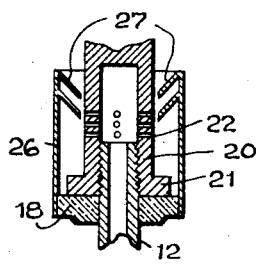 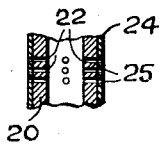
Theron Davis, Inventor,
By his Attorney,
W. B. Hutchinson Patented Dec. 12, 1922.

1,438,300

UNITED STATES PATENT OFFICE.

THERON DAVIS, OF NEW YORK, N. Y.

SPARK PLUG.

Application filed November 10, 1919. Serial No. 336,779.

*To all whom it may concern:*

Be it known that I, THERON DAVIS, a citizen of the United States, and resident of the borough of Manhattan, New York city, and State of New York, have invented a new and useful Improvement in Spark Plugs for Internal-Combustion Engines, of which the following is a full, clear, and exact description.

My invention relates to improvements in spark plugs and the object of my invention is to produce a spark plug which will serve to provide a spark to ignite the charge of an internal combustion engine and further will provide means for admitting oxygen, air, or the like to the cylinder at each charge.

It is well known that one of the chief troubles with internal combustion engines arises from the accumulation of carbon within the cylinder and this carbon will accumulate around the spark plug so as to make a short circuit. The chief cause of the accumulation of carbon is that the gaseous fuel is imperfectly consumed. In addition the carbon interferes with the proper action of the piston. This imperfect combustion is on account of the lack of sufficient oxygen to maintain perfect combustion. The gaseous material admitted to the cylinder is frequently too rich and as there is little oxygen present and not enough passes through the carbureter to provide complete combustion, the result is the production and deposition of carbon.

My invention contemplates the elimination of this difficulty by providing a spark plug which will supply air or the like at each stroke of the piston to afford complete combustion by which the deposition of carbon is prevented and greater efficiency is attained because it follows that more perfect combustion means a more perfect explosion and for a given amount of fuel a greater amount of power is obtained.

In carrying out this idea I provide an air passage through the spark plug with an automatic valve in the spark plug, which after each charge is admitted including the oxygen supply, will close by the cylinder pressure so as to hermetically seal the air inlet and prevent the leakage of fuel. Then after the explosion and the exhaust of the exploded charge is released from the cylinder, the aforesaid valve will open under the external air pressure and permit air to flow into the cylinder with the incoming fuel charge. For practical purposes I find that the atmosphere air contains sufficient oxygen to permit the desired degree of combustion and it will be understood, of course, that oxygen in a more concentrated form may be admitted through the spark plug, all of which will be more clearly understood from the description which follows.

Reference is to be had to the accompanying drawings forming a part of this specification in which similar reference letters and figures refer to similar parts throughout the complete drawings.

Fig. 1 is a longitudinal section of a spark plug embodying my invention.

Fig. 2 is a bottom end view of the plug.

Fig. 3 is a broken detailed sectional view showing the application of an air filter to the plug.

Fig. 4 is a broken detailed view showing a damper for regulating the air inlet.

My invention is intended to cover a spark plug in which and through which air or oxygen is admitted to promote combustion in the cylinder of an internal combustion engine and the drawings are merely by way of example to show a practical means of carrying out and into effect this idea with no intention of limiting the invention to the drawings shown.

As illustrated a shell 10 is used which is more or less conventional and has a threaded lower end 11 to facilitate its attachment to the cylinder. Extending longitudinally through the shell and spaced apart therefrom, is a hollow electrode 12 preferably in the form of a cylindrical tube which projects from the lower end of the shell and which preferably has a flange 13 abutting with an insulated washer 14 this being firmly secured in the lower part of the shell. The washer therefore serves the purpose of not only insulating the electrode but of properly spacing it with respect to the shell.

At the lower end of the electrode is a valve 15 which seats snugly against the end of the electrode and which moves freely in a vertical direction and can be held in place in any suitable way as for instance by the wires 16 secured to the lower end of the electrode 12, and extending beneath the valve. The valve is also a conductor and is properly spaced from the second electrode or wire connecting with the shell 10 as is usual or in any preferred way to form a ground connection.

At the upper end of the shell 10 is a second insulated washer 18 which is held firmly in the shell and through which the electrode 12 extends. The upper part of the electrode is preferably screw-threaded as shown at 19 to receive the internally screw-threaded end of the nut member 20 which is shown as hollow and which has preferably a flanged lower extremity 21 bearing against the top of the washer 18 so that when the hollow nut member 20 is screwed down firmly on the electrode 19 the washer 18 will be clamped firmly to the top of the shell 10 and the washer 14 will be clamped firmly to the lower end of the shell by reason of the flange 13 which underlies the washer 14.

The member 20 is of conducting material and is provided with air holes 22 located upon the upper end of the tubular electrode 12 and adapted to admit sufficient air for the intended purposes. The upper end of the member 20 is preferably closed and provided with the common or any preferred binding post connection as shown at 23.

If desired a sleeve 24 can be placed over the member 20 this sleeve having air inlets 25 therein and by turning the sleeve the desired amount of air can be permitted to pass through and into the electrode, this sleeve acting like an ordinary register.

From the foregoing description it will be seen that after the charge has been exploded so that the internal pressure in the cylinder is reduced the valve 15 will drop under the pressure of the outside air and air will be drawn in or flow in through the openings 22 and the electrode 12 to the cylinder and when the internal pressure exceeds the outside pressure the valve will be forced to its seat and will prevent the escape of the mixture through the plug. Obviously the electrode may be provided with a more concentrated form of oxygen or air under pressure if desired.

It will of course be readily seen that the detailed construction which I have described may be changed materially without affecting the principle of the invention. For some purposes it may be desired to filter the air passing into the cylinder so as to exclude dust or extraneous matter and this can be done easily by surrounding the member 20 with a suitable casing 26 which can be attached to the washer 18 or any other part of the plug and this can have baffles 27 extending inward and preferably downwardly inclined so as to allow a space between their inner edges and the member 20 and oily waste or other filtering material can be placed upon the baffles.

I claim:

1. A spark plug comprising a shell adapted for attachment to a cylinder, a tubular electrode extending longitudinally through the shell and insulated and spaced apart therefrom, said electrode having an unobstructed air passage extending entirely through it from end to end, a guided valve opposite and adapted to close against the inner end of the electrode, and a nut member fitting over the outer end of the electrode and adapted to fasten the same to the shell, said nut member being hollow and having air openings through its wall.

2. A spark plug comprising a shell adapted for attachment to a cylinder, a tubular electrode extending longitudinally through the shell and insulated and spaced apart therefrom so as to leave an air space between the shell and electrode, and a valve opposite and adapted to close against the inner extremity of the electrode so as to leave the bore of the electrode free, and means for guiding the valve so that it will move in and out with relation to the inner end of the electrode.

3. A spark plug comprising a shell adapted for attachment to a cylinder, an insulating washer at the inner portion of the shell, an insulating washer at the outer part of the shell, an electrode extending through and held by the said washers, a hollow nut member fitting the outer part of the electrode and abutting with the outer washer, said nut member having air openings therein, and a freely moving independent valve at the inner end of the electrode adapted to open and close the same.

4. A spark plug comprising a shell adapted for attachment to a cylinder, a hollow electrode extending longitudinally through the shell and insulated and spaced apart therefrom, a freely moving independent valve at the inner end of the electrode, a hollow nut member fitting over the outer end of the electrode, said nut member having air openings therethrough, and means for regulating the inflow of air.

5. A spark plug having a shell adapted for attachment to a cylinder, a tubular electrode extending through the shell and insulated therefrom, a hollow nut member connected with the outer end of the electrode and provided with perforated walls, and a perforated sleeve turning on the said nut member by which the air openings may be regulated.

THERON DAVIS.

Witnesses:
WARREN B. HUTCHINSON,
M. T. O'DONNELL.